United States Patent
Hutchins et al.

(10) Patent No.: US 10,473,228 B2
(45) Date of Patent: Nov. 12, 2019

(54) SOLENOID VALVE WITH AN INTEGRATED CHECK VALVE FUNCTIONALITY FOR AN AIR BRAKING SYSTEM OF A HEAVY VEHICLE

(71) Applicant: Bendix Commercial Vehicle Systems LLC, Elyria, OH (US)

(72) Inventors: Christopher H Hutchins, Bay Village, OH (US); David W Howell, Oak Ridge, NC (US); Thanh Ho, Brunswick, OH (US); Tarah L Peabody, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 207 days.

(21) Appl. No.: 15/619,592

(22) Filed: Jun. 12, 2017

(65) Prior Publication Data

US 2018/0355994 A1    Dec. 13, 2018

(51) Int. Cl.
*F16K 31/06* (2006.01)
*B60T 13/26* (2006.01)
(Continued)

(52) U.S. Cl.
CPC .......... *F16K 31/0627* (2013.01); *B60T 8/341* (2013.01); *B60T 13/26* (2013.01);
(Continued)

(58) Field of Classification Search
CPC .. F16K 31/0606; F16K 31/0627; B60T 8/365; B60T 8/3615; B60T 8/3635
See application file for complete search history.

(56) References Cited

U.S. PATENT DOCUMENTS 2,935,091 A * 5/1960 Wisman .............. F16K 31/0606
                                                    137/627.5
3,043,336 A    7/1962 Pierre
(Continued)

OTHER PUBLICATIONS

Bendix Commercial Vehicle Systems LLC "Bendix SMS-9700 Accessory Solenoid Manifold," Service Data Sheet SD-03-10432, Sep. 2012, 4 pages, Bendix Commercial Vehicle Systems LLC, Elyria Ohio, United States of America.
(Continued)

*Primary Examiner* — Matthew W Jellett
*Assistant Examiner* — Christopher D Ballman
(74) *Attorney, Agent, or Firm* — Cheryl Greenly; Brian Kondas; Eugene Clair (57) ABSTRACT

A solenoid valve comprises first, second, and third ports. The solenoid valve further comprises an armature movable between a first position in which fluid flow from the second port to the third port is blocked and fluid flow from the first port to the third port is unblocked and a second position in which fluid flow from the second port to the third port is unblocked and fluid flow from the first port to the third port is blocked. The fluid flow in the second position is blocked until fluid pressure at the first port exceeds fluid pressure at the third port by a predetermined amount to thereby provide check valve functionality. The check valve functionality is integral to the armature. The solenoid valve also comprises an energizeable solenoid that, when energized, moves the armature from the first position to the second position.

13 Claims, 4 Drawing Sheets

(51) Int. Cl.
*B60T 8/34* (2006.01)
*F15B 13/04* (2006.01)
B60T 8/32 (2006.01)
B60T 8/36 (2006.01)

(52) U.S. Cl.
CPC ........... *F15B 13/0405* (2013.01); *B60T 8/321* (2013.01); *B60T 8/365* (2013.01); *B60T 8/3615* (2013.01); *B60T 8/3635* (2013.01); *F16K 31/0606* (2013.01)

(56) References Cited

U.S. PATENT DOCUMENTS

| | | | | |
|---|---|---|---|---|
| 3,842,860 | A * | 10/1974 | Stampfli | F16K 31/0606 137/596.17 |
| 3,983,909 | A * | 10/1976 | Anglade | F16K 11/056 137/625.65 |
| 4,102,526 | A * | 7/1978 | Hargraves | F16K 31/0606 137/625.65 |
| 4,177,774 | A * | 12/1979 | Moshal | B60K 31/08 123/360 |
| 4,299,252 | A * | 11/1981 | Reinicke | F16K 31/0606 137/625.5 |
| 4,326,696 | A * | 4/1982 | Ishikawa | F16K 31/0606 137/625.65 |
| 4,442,864 | A * | 4/1984 | Kosugi | F16K 31/0606 137/625.27 |
| 4,922,965 | A * | 5/1990 | Meister | F16K 31/0606 137/625.65 |
| 5,083,590 | A | 1/1992 | Gattolliat | |
| 5,251,667 | A * | 10/1993 | Kunz | F16K 11/044 137/607 |
| 5,503,185 | A * | 4/1996 | Krause | F16K 31/0606 137/625.65 |
| 5,810,330 | A | 9/1998 | Eith | |
| 5,992,461 | A * | 11/1999 | Gilmore | H01F 7/081 137/625.65 |
| 6,254,200 | B1 | 7/2001 | Ganzel | |
| 6,276,392 | B1 * | 8/2001 | Hendrickson | G05D 16/0661 137/271 |
| 6,328,275 | B1 | 12/2001 | Yang | |
| 8,267,107 | B2 * | 9/2012 | Ho | F15D 1/00 137/1 |
| 8,590,571 | B2 | 11/2013 | Ho | |
| 9,530,552 | B1 * | 12/2016 | Shen | H01F 7/066 |
| 2005/0269538 | A1 * | 12/2005 | Haynes | F16K 31/0606 251/129.15 |
| 2006/0283510 | A1 * | 12/2006 | Pechtold | F16K 1/302 137/625.5 |
| 2009/0302250 | A1 * | 12/2009 | Ho | F16K 31/0606 251/129.15 |
| 2009/0309413 | A1 * | 12/2009 | Bensch | B60T 8/362 303/20 |
| 2009/0312674 | A1 * | 12/2009 | Nakao | A61H 9/0078 601/9 |
| 2010/0107669 | A1 * | 5/2010 | Wada | F16K 11/044 62/196.1 |
| 2010/0270487 | A1 | 10/2010 | Ambrose | |
| 2012/0312645 | A1 | 12/2012 | Frashure | |
| 2014/0042347 | A1 * | 2/2014 | Williams | F16K 31/0606 251/129.02 |
| 2014/0084194 | A1 * | 3/2014 | Kibune | F16K 27/029 251/129.15 |
| 2014/0097369 | A1 | 4/2014 | Lee | |
| 2015/0233488 | A1 | 7/2015 | Holmes | |
| 2016/0239025 | A1 * | 8/2016 | van der Merwe | F16K 31/082 |
| 2017/0067571 | A1 | 3/2017 | Burger | |
| 2017/0089483 | A1 * | 3/2017 | Aihara | F16K 31/0606 |

OTHER PUBLICATIONS

Bendix Commercial Vehicle Systems LLC, Bendix FCS-9700 Fan Clutch Solenoid, Service Data Sheet SD-03-10433, Sep. 2012, 2 pages, Bendix Commercial Vehicle Systems LLC, Elyria Ohio, United States of America.

European Patent Office, "Written opinion and International search report," Search report, dated Sep. 6, 2018, 9 pages, European patent office, Munich Germany.

* cited by examiner

SOLENOID VALVE WITH AN INTEGRATED CHECK VALVE FUNCTIONALITY FOR AN AIR BRAKING SYSTEM OF A HEAVY VEHICLE

BACKGROUND

The present application relates to heavy vehicle air braking systems, and is particularly directed to a solenoid valve with an integrated check valve functionality for an air braking system of a heavy vehicle, such as a truck.

Some air braking systems include an anti-lock brake system (ABS) that has a number of ABS modulator valves. The ABS modulator valves are controlled in response to electrical control signals from an ABS controller to modulate air flow to service brake chambers to prevent locking of braked wheels to improve the braking characteristics of the heavy vehicle. Some air braking systems include a traction control system that has a number of traction relay valves. The traction relay valves are controlled in response to electrical control signals from a traction controller to modulate air flow to service brake chambers to improve the traction characteristics of the heavy vehicle. In valve designs of known ABS modulator valves and traction relay valves, air flow in both directions between a control port and a delivery port of a valve are blocked when the valve is energized. Many types of valves including ABS modulator valves and traction relay valves are used in an air braking system to provide various braking functions for the heavy vehicle. It would be desirable to improve designs of valves that are used in air braking systems of heavy vehicles.

SUMMARY

In accordance with an embodiment, a solenoid valve with an integrated check valve functionality is provided. The solenoid valve comprises first, second, and third ports. The solenoid valve further comprises an armature movable between a first position in which fluid flow from the second port to the third port is blocked and fluid flow from the first port to the third port is unblocked and a second position in which fluid flow from the second port to the third port is unblocked and fluid flow from the first port to the third port is blocked until fluid pressure at the first port exceeds fluid pressure at the third port by a predetermined amount of fluid pressure to thereby provide the check valve functionality. The check valve functionality is integral to the armature. The solenoid valve also comprises an energizeable solenoid for, when energized, moves the armature from the first position to the second position.

In accordance with another embodiment, a solenoid valve with an integrated check valve functionality is provided for an air braking system of a heavy vehicle. The solenoid valve comprises a valve body having a first supply port, a second supply port, and a delivery port. The valve further comprises an armature positioned in the valve body and movable between a first position in which fluid flow from the second supply port to the delivery port is blocked and fluid flow from the first supply port to the delivery port is unblocked and a second position in which fluid flow from the second supply port to the delivery port is unblocked, fluid flow from the delivery port to the first supply port is blocked, and fluid flow from the first supply port to the delivery port is blocked until the fluid pressure at the first supply port exceeds the fluid pressure at the delivery port by a predetermined amount of fluid pressure to thereby provide the check valve functionality for the air braking system of the heavy vehicle. The check valve functionality is integral to the armature. The solenoid valve also comprises an energizeable solenoid for, when energized, moves the armature from the first position to the second position.

In accordance with still another embodiment, a solenoid valve comprises a valve body having a first port, a second port, and a third port. The solenoid valve further comprises an armature movable between a first position in which fluid flow from the second port to the third port is blocked and a second position in which fluid flow from the second port to the third port is unblocked. The armature includes means for supporting one-way fluid flow from the first port to the third port when the armature is in the second position and fluid pressure at the first port exceeds fluid pressure at the third port by a predetermined amount of fluid pressure to provide functionality of a one-way check valve between the first port and the third port. The functionality of a one-way check valve between the first port and the third port is integral to the armature. The solenoid valve also comprises an energizeable solenoid for, when energized, moves the armature from the first position to the second position.

DETAILED DESCRIPTION

Figure 1:
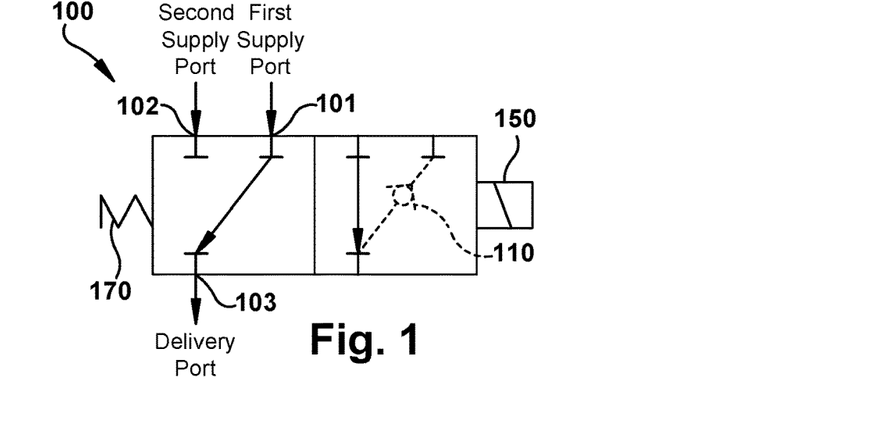
FIG. 1 is a schematic representation of an example solenoid valve constructed in accordance with an embodiment, and showing the solenoid valve in a non-energized position.

Referring to FIG. 1, a schematic representation of an example solenoid valve 100 constructed in accordance with an embodiment is illustrated. Solenoid valve 100 has an integrated check valve functionality that can be applied in a heavy vehicle, such as a truck. The truck has a pneumatic (i.e., air) braking system that is equipped with an anti-lock braking system (ABS) or a traction control system, or both. Solenoid valve 100 is responsive to one or more signals from one or more controllers (not shown) of the air braking system. Structure and operation of air braking systems including controllers therefor are known and, therefore will not be described.

As an example application of solenoid valve 100 in an air braking system, solenoid valve 100 has two modes of operation. In one mode of operation, the output pressure of solenoid valve 100 is a driver's brake demand (i.e., the output pressure from a driver demand device such as a brake treadle valve). In the other mode of operation, the output pressure of solenoid valve 100 is the higher of the driver's brake demand or a regulated pressure (e.g., typically less than system pressure). This example application of solenoid valve 100 is known as a driver priority action. Alternatively, air actuated accessories could benefit from this operation of having two different pressures.

Solenoid valve 100 is provided with an integrated check valve functionality as will be described herein. Notably, the check valve functionality is integrated in solenoid valve 100 such that a check valve component that is separate from solenoid valve 100 is not needed when the check valve functionality is desired.

Solenoid valve 100 is shown in the schematic representation of FIG. 1 in a non-energized position. Solenoid valve 100 has first port 101 in the form of a first supply port, second port 102 in the form of a second supply port, and third port 103 in the form of a delivery port. In the non-energized position, first supply port 101 is connected in fluid communication with delivery port 103 and so fluid flow from first supply port 101 to delivery port 103 is unblocked. Second supply port 102 is not in fluid communication with delivery port 103 and so fluid flow from second supply port 102 to delivery port 103 is blocked. In order to exhaust the pressure at delivery port 103 to atmosphere, an exhaust valve (not shown) is located upstream of first supply port 101 or second supply port 102.

Figure 2:
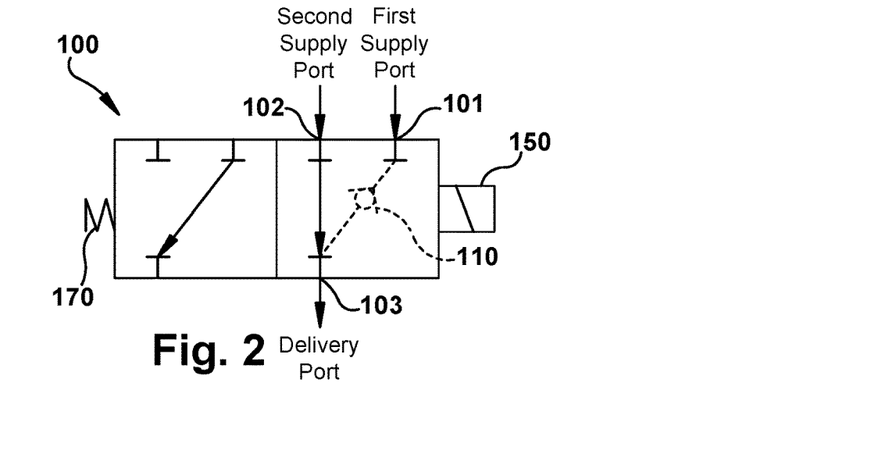
FIG. 2 is a schematic representation similar to FIG. 1, and showing the solenoid valve in an energized position.

Solenoid valve 100 is shown in the schematic representation of FIG. 2 in an energized position. In the energized position, second supply port 102 is connected in fluid communication with delivery port 103 and so fluid flow from second supply port 102 to delivery port 103 is unblocked.

First supply port 101 is not in fluid communication with delivery port 103 until pressure at first supply port 101 exceeds the fluid pressure at delivery port 103. Fluid flow in the direction from first supply port 101 to delivery port 103 is blocked until a predetermined pressure differential is reached.

More specifically, fluid flow from first supply port 101 to delivery port 103 is blocked until the fluid pressure at first supply port 101 exceeds the fluid pressure at delivery port 103 by a predetermined amount of fluid pressure. Fluid flow in the direction from delivery port 103 to first supply port 101 is blocked when solenoid 100 is in its energized position of FIG. 2. This unidirectional fluid flow feature between first supply port 101 and delivery port 103 provides the check valve functionality that is integrated into solenoid valve 100. The integrated check valve functionality is schematically shown in FIG. 2 using a conventional check valve symbol in dashed lines between first supply port 101 and delivery port 103, and is designated with reference numeral "110".

Figure 3:
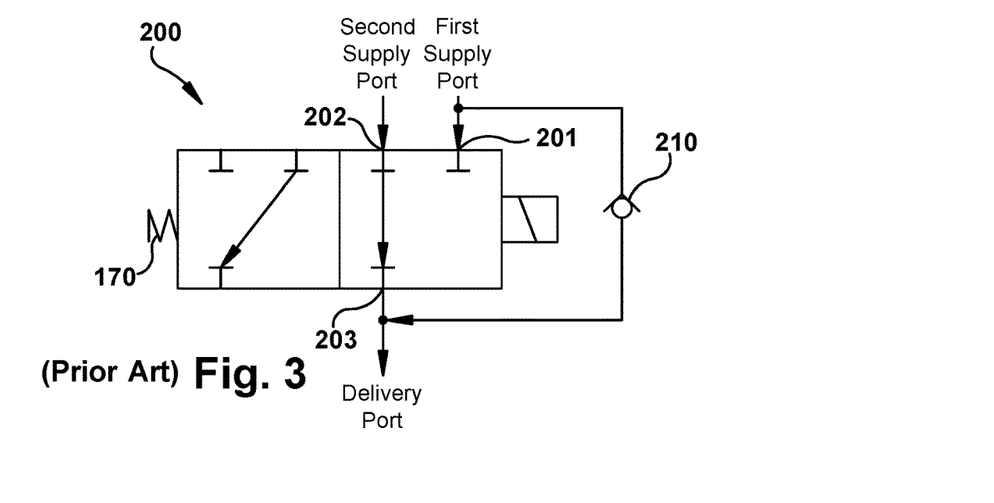
FIG. 3 is a schematic representation similar to FIG. 2, and showing a solenoid valve in the prior art.

Advantageous results of the above-described example embodiment can be illustrated by comparing solenoid valve 100 shown in FIGS. 1 and 2 with a prior art solenoid valve 200 shown in FIG. 3. Prior art solenoid valve 200 includes first port 201 as a first supply port, second port 202 as a second supply port, and third port 203 as a delivery port. Solenoid valve 200 is shown in the schematic representation of FIG. 3 in an energized position. In the energized position, second supply port 202 is connected in fluid communication with delivery port 203 and so fluid flow from second supply port 202 to delivery port 203 is unblocked. First supply port 201 is not in fluid communication with delivery port 203 and so fluid flow from first supply port 201 to delivery port 203 is blocked in both directions.

Check valve 210 is a component that is physically separate from solenoid valve 200. Check valve 210 is effectively connected in parallel with solenoid valve 200. In particular, check valve 210 is connected across first supply port 201 and delivery port 203. Check valve 210 blocks fluid flow therethrough until there is a predetermined pressure differential between first supply port 201 and delivery port 203. Fluid flow through check valve 210 is blocked until the predetermined pressure differential is reached. More specifically, fluid flow through check valve 210 is unblocked when fluid pressure at first supply port 201 exceeds fluid pressure at delivery port 203 by a predetermined amount of fluid pressure. Since check valve 210 is a component that is separate from solenoid valve 200, the check valve functionality of check valve 210 is not integrated into solenoid valve 200.

In contrast, example solenoid valve 100 of FIG. 2 constructed in accordance with an embodiment of the present application is provided with a check valve functionality that is integrated into solenoid valve 100. Accordingly, no separate check valve is needed when the check valve functionality is desired. The absence of a need to provide a separate check valve is attributable to the design of solenoid valve 100 as will be described hereinbelow.

Figure 4A:
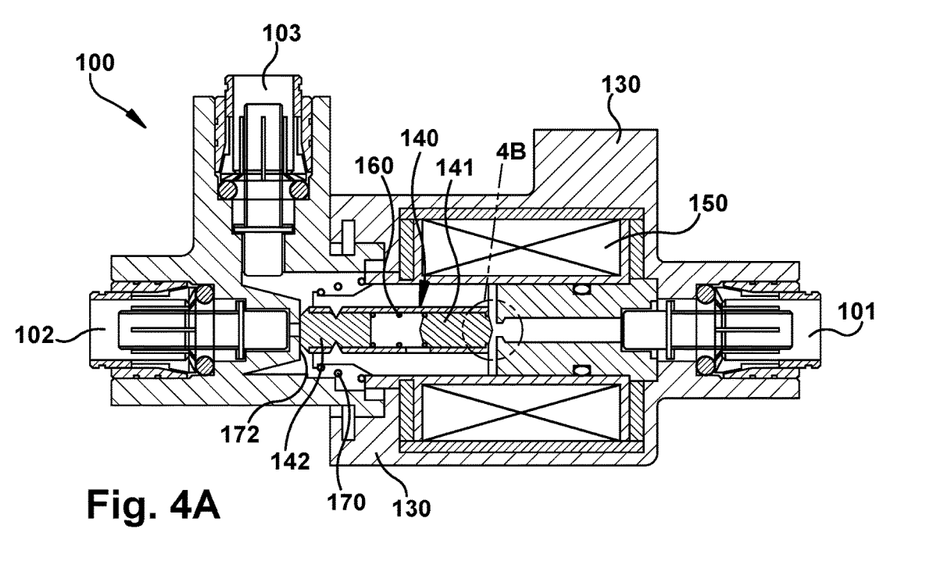
FIG. 4A is a sectional view of an example construction of a solenoid valve in the non-energized position of FIG. 1.
Figure 4B:
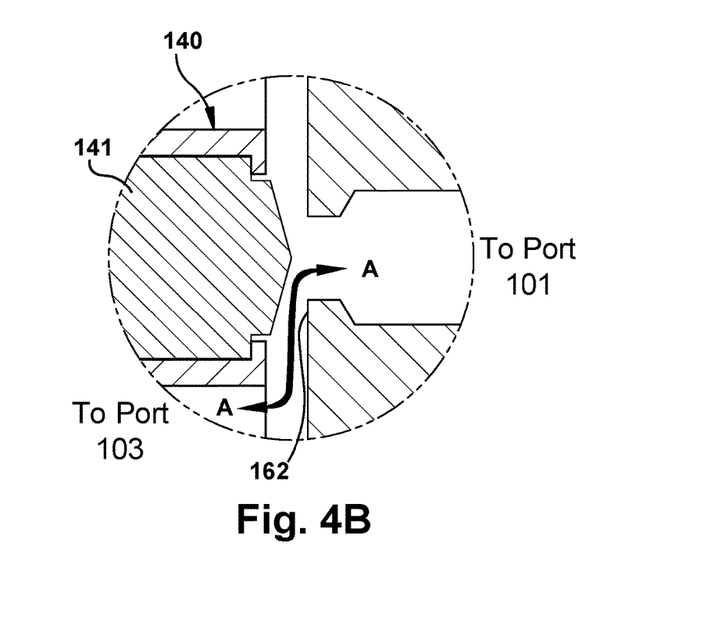
FIG. 4B is an enlarged view of a portion, marked as a circle "4B" in FIG. 4A, and showing the position of parts of the solenoid valve in the non-energized position of FIG. 4A.
Figure 5A:
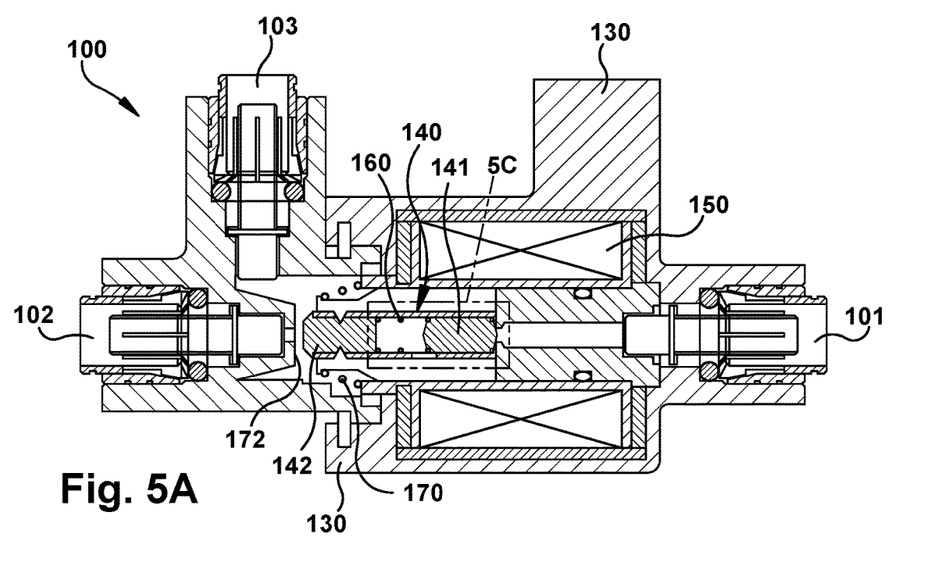
FIG. 5A is a sectional view similar to the sectional view of FIG. 4A, and showing the example solenoid valve in the energized position of FIG. 2.
Figure 5B:
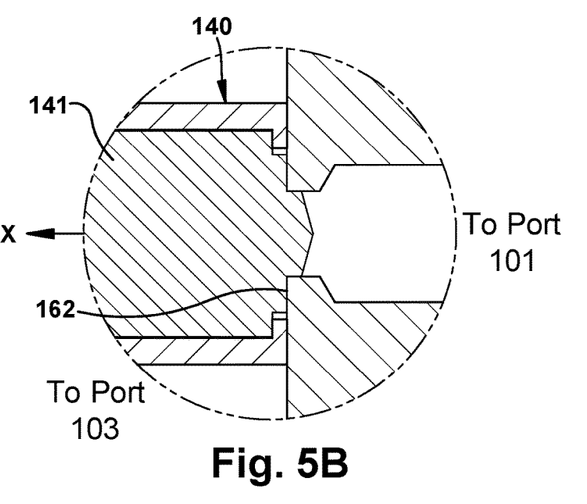
FIG. 5B is an enlarged view similar to the enlarged view of FIG. 4B, and showing the position of parts of the solenoid valve in the energized position of 5A.

Referring to FIGS. 4A and 5A, sectional views of an example construction of solenoid valve 100 of FIGS. 1 and 2 are illustrated. FIG. 4A is a sectional view of the example construction of solenoid valve 100 in the non-energized position corresponding to FIG. 1. FIG. 4B is an enlarged view of a portion, marked as a circle "4B" in FIG. 4A, and showing the position of parts of solenoid valve 100 in the non-energized position of FIG. 4A. FIG. 5A is a sectional view of the example construction of solenoid valve 100 in the energized position corresponding to FIG. 2. FIG. 5B is an enlarged view similar to the enlarged view of FIG. 4B, and showing the position of parts of solenoid valve 100 in the energized position of 5A.

Solenoid valve 100 includes valve body 130 that has three ports. More specifically, valve body 130 has first supply port 101 (a first port), second supply port 102 (a second port), and delivery port 103 (a third port). Solenoid valve 100 further includes armature 140 positioned in valve body 130 and is movable between a first position (i.e., the non-energized position shown in FIGS. 4A and 4B) and a second position (i.e., the energized position shown in FIGS. 5A and 5B). Solenoid valve 100 also includes energizeable solenoid 150 (also shown schematically in FIGS. 1 and 2) for, when energized, moves armature 140 to the right (as viewed looking at FIGS. 4A and 4B) from the first position of FIGS. 4A and 4B to the second position of FIGS. 5A and 5B.

When armature 140 is in the first position of FIGS. 4A and 4B, fluid flow from second supply port 102 to delivery port 103 is blocked and fluid flow from first supply port 101 to delivery port 103 is unblocked. Fluid can flow in both directions between first supply port 101 and delivery port 103 via the fluid path marked as bidirectional arrowed line "A-A" in FIG. 4B.

When armature 140 is in the second position of FIGS. 5A and 5B, fluid flow from second supply port 102 to delivery port 103 is unblocked, and fluid flow from delivery port 103 to first supply port 101 is blocked. Also, when armature 140 is in the second position of FIGS. 5A and 5B, fluid flow from first supply port 101 to delivery port 103 is blocked until the fluid pressure at first supply port 101 exceeds the fluid pressure at delivery port 103 by a predetermined amount of fluid pressure to provide the check valve functionality.

More specifically, armature 140 includes movable first armature portion 141 and non-movable armature portion 142. When armature 140 is in the first position of FIGS. 4A and 4B, second armature portion 142 blocks fluid flow from second supply port 102 to delivery port 103, and armature 140 allows bidirectional fluid flow between first supply port 101 and delivery port 103 (FIG. 4B). When armature 140 is in the second position of FIGS. 5A and 5B, armature 140 allows fluid flow from second supply port 102 to delivery port 103, and first armature portion 141 blocks fluid flow between first supply port 101 and delivery 103 (FIG. 5B).

Figure 5C:
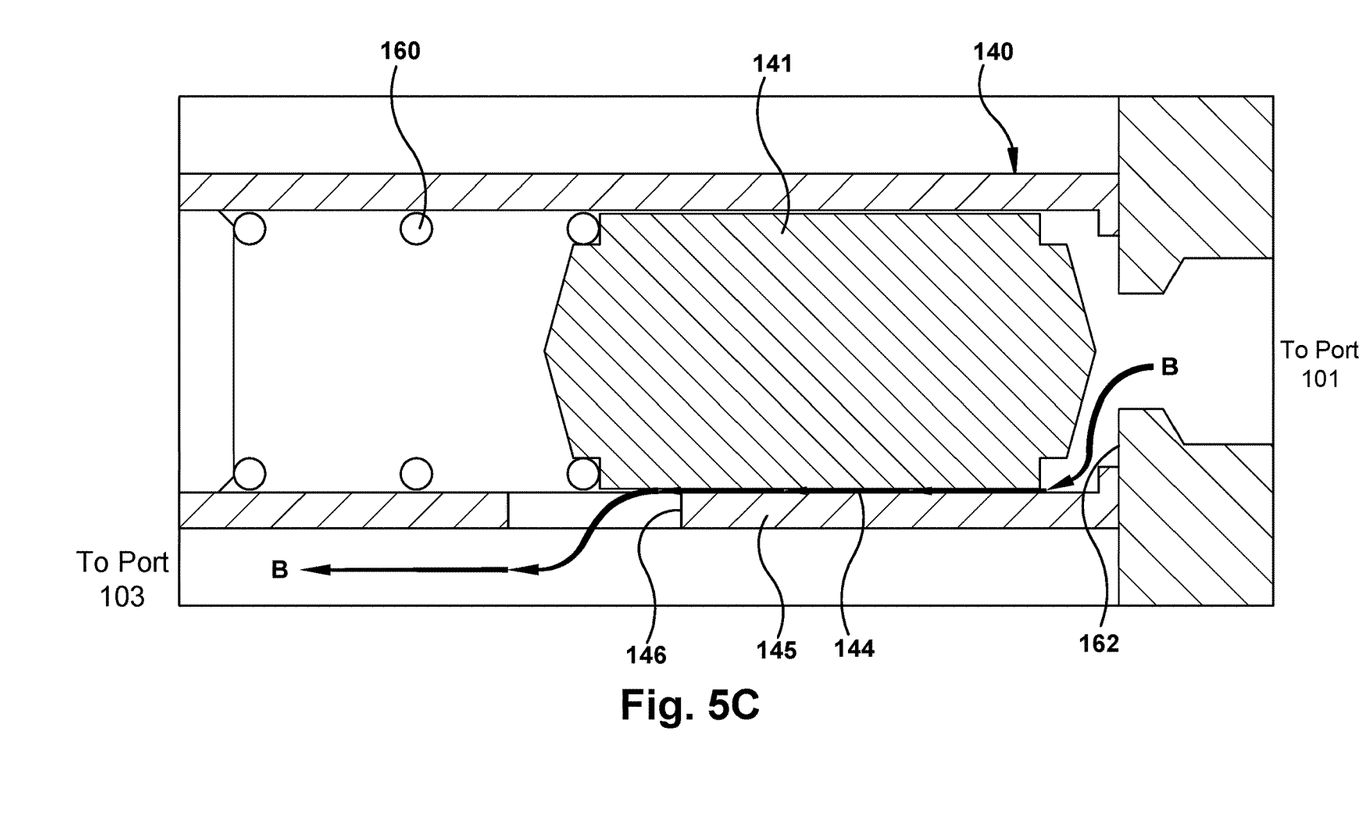
FIG. 5C is an enlarged view of a portion, marked as a rectangle "5C" in FIG. 5A, and showing the position of parts of the solenoid valve when the fluid pressure at a port of the solenoid valve exceeds the fluid pressure at another port of the solenoid valve by a predetermined amount of fluid pressure.

Referring to FIG. 5C, an enlarged view of a portion, marked as a rectangle "5C" in FIG. 5A, is illustrated. FIG. 5C shows the position of parts of solenoid valve 100 when the fluid pressure at first supply port 101 exceeds the fluid pressure at delivery port 103 by the predetermined amount of fluid pressure. In particular, when the fluid pressure at first supply port 101 exceeds the fluid pressure at delivery port 103 by the predetermined amount of fluid pressure, first armature portion 141 moves to the left (as viewed looking at FIGS. 5A and 5B and indicated by arrow "X" in FIG. 5B) from the position shown in FIGS. 5A and 5B to the position shown in FIG. 5C. When first armature portion 141 moves to the left, fluid flows from first supply port 101, along narrow fluid passage 144 defined between first armature portion 141 and wall portion 145 of armature 140, and then through opening 146 defined in wall portion 145 to delivery port 103 via the fluid path marked as unidirectional arrowed line "B-B" in FIG. 5C.

Thus, armature 140 including first and second armature portions 141, 142 move together as a unit to the right (as viewed looking at FIGS. 4A and 4B) from the first position shown in FIGS. 4A and 4B to the second position shown in FIGS. 5A and 5B when solenoid 150 is energized. Then, when armature 140 is in the second position shown in FIGS. 5A and 5B, only first armature portion 141 (and not second armature portion 142) moves to the left in response to the fluid pressure at first supply port 101 exceeding the fluid pressure at delivery port 103 by the predetermined amount of fluid pressure. Movement of first armature portion 141 to the left allows fluid flow from first supply port 101 to delivery port 103 via the fluid path "B-B" shown in FIG. 5C. The allowance of fluid flow via the fluid path "B-B" when the fluid pressure at first supply port 101 exceeds the fluid pressure at delivery port 103 by the predetermined amount of fluid pressure provides the check valve functionality feature of solenoid valve 100.

In some embodiments, first armature portion 141 comprises a select one of a pill, a shuttle, and a flap, which moves to allow fluid flow from first supply port 101 to delivery port 103 when the fluid pressure at first supply port 101 exceeds the fluid pressure at delivery port 103 by the predetermined amount of fluid pressure.

Solenoid valve 100 further includes first biasing member 160 positioned between first and second armature portions 141, 142. First biasing member 160 provides a biasing force that corresponds to the predetermined amount of fluid pressure that the fluid pressure at first supply port 101 needs to exceed the fluid pressure at delivery port 103 before fluid flow from first supply port 101 to delivery port 103 is allowed to provide the check valve functionality.

More specifically, first biasing member 160 provides a biasing force that maintains first armature portion 141 against a normally-open valve seat 162 (as shown in FIGS. 5A and 5B) associated with first supply port 101. When the fluid pressure at first supply port 101 exceeds the fluid pressure at delivery port 103 by the predetermined amount of fluid pressure, the excess fluid pressure causes first armature portion 141 to become unseated (as shown in FIG. 5C) from normally-open valve seat 162 to allow fluid flow from first supply port 101 to delivery port 103.

In some embodiments, the predetermined amount of fluid pressure varies as a function of the biasing force of first biasing member 160. First biasing member 160 also assists in sealing the select one of a pill, a shuttle, and a flap (i.e., first armature portion 141). In some embodiments, first biasing member 160 is selected such that the predetermined amount of fluid pressure is about ten pounds per square inch (psi) or less. In some embodiments, first biasing member 160 is selected such that the predetermined amount of fluid pressure is substantially zero. In some embodiments, it is conceivable that first biasing member 160 be absent or removed. In this case, the predetermined amount of fluid pressure would be zero.

Solenoid valve 100 also includes second biasing member 170 (also shown schematically in FIGS. 1 and 2) positioned in the vicinity of second armature portion 142. Second biasing member 170 provides a biasing force that maintains second armature portion 142 against a normally-closed valve seat 172 (as shown in FIG. 4A) associated with second supply port 102. When solenoid 150 is energized, second armature portion 142 becomes unseated from normally-closed valve seat 172 (as shown in FIG. 5A) to allow fluid flow from second supply port 102 to delivery port 103. The biasing force of second biasing member 170 also returns armature 140 from the energized position of FIGS. 5A and 5B back to the non-energized position of FIGS. 4A and 4B when solenoid 150 is de-energized.

First biasing member 160 may comprise a first coil spring having a longitudinal central axis, and second biasing member 170 may comprise a second coil spring having a longitudinal central axis that is coincident with the longitudinal axis of the second coil spring.

It should be apparent that armature 140 is designed such that first armature portion 141 (e.g., a pill, shuttle, or flap) is moved to allow fluid flow from first supply port 101 to delivery port 103 in a similar manner as that of a separate conventional one-way check valve. Accordingly, check valve functionality is integrated into solenoid valve 100, and more specifically integrated into armature 140 of solenoid valve 100.

It should also be apparent that means is provided for supporting one-way fluid flow (i.e., unidirectional fluid flow) from first supply port 101 to delivery port 103 when armature 140 is in the position of FIGS. 5A and 5B and the fluid pressure at first supply port 101 exceeds the fluid pressure at delivery port 103 by the predetermined amount of fluid pressure to provide functionality of a one-way check valve between first supply port 101 and delivery port 103. The functionality of a one-way check valve between first supply port 101 and delivery port 103 is integral to armature 140. In some embodiments, the means includes a select one of a pill, a shuttle, and a flap, which moves to allow fluid flow from first supply port 101 to delivery port 103 when the fluid pressure at first supply port 101 exceeds the fluid pressure at delivery port 103 by the predetermined amount of fluid pressure. In some embodiments, the means includes biasing member 160 that maintains the select one of a pill, a shuttle, and a flap against a normally-open valve seat associated with first supply port 101 until the fluid pressure at first supply port 101 exceeds the fluid pressure at delivery port 103 by the predetermined amount of fluid pressure.

It should further be apparent that solenoid valve 100 functions as a check valve between first supply port 101 and delivery port 103 only at certain times (as shown in FIG. 5C), while at other times it is open for two-way fluid flow (as shown in FIGS. 4A and 4B). Solenoid valve 100 with the integrated check valve functionality can support different vehicle braking applications, such as a hill start assist braking event (i.e., a driver priority action) described hereinabove. Other types of braking events that need a solenoid valve with an integrated check valve functionality can also be supported. Other types of braking events include automated brake system actuation, such as that with an adaptive cruise control system with precedence of driver brake actuation.

It should further be apparent that the predetermined amount fluid pressure at which the check valve functionality switches ON and OFF depends upon the biasing force provided by first biasing member 160. In the case where first biasing member 160 comprises a coil spring, the predetermined amount of fluid pressure would depend upon the stiffness characteristics of the coil spring.

A number of advantages are provided by using solenoid valve 100 in a air braking system of a heavy vehicle, such as a truck. One advantage is that a separate check valve is not needed when a specific vehicle braking application requires functionality of a check valve. By not having to provide a separate check valve when an application calls for functionality of a check valve, the number of components needed is reduced. The result is lower component costs and higher system reliability.

Although the above description describes solenoid valve 100 of FIG. 1 being embodied in a vehicle having ABS modulator valves or traction relay valves, or both, it is conceivable that solenoid valve 100 can be embodied in a vehicle that is not equipped with ABS modulator valves or traction relay valves. In this case, solenoid valve 100 would be embodied in a different vehicle braking application. It is also conceivable that solenoid valve 100 can be embodied in a vehicle operation that is not a braking operation. For example, solenoid valve 100 can be embodied in any operation of the vehicle where a supply pressure could be less than what a driver could demand during a braking action such that the driver can override the initial pressure delivered by solenoid valve 100. In all of these braking and non-braking applications, a separate check valve is not needed since the check valve functionality as described herein is integrated into solenoid valve 100.

While the present disclosure has been illustrated by the description of example processes and system components, and while the various processes and components have been described in detail, applicant does not intend to restrict or in any limit the scope of the appended claims to such detail. Additional modifications will also readily appear to those skilled in the art. The disclosed in its broadest aspects is therefore not limited to the specific details, implementations, or illustrative examples shown and described. Accordingly, departures may be made from such details without departing from the spirit or scope of applicant's general disclosed concept.

What is claimed is:

1. A solenoid valve with an integrated check valve functionality, the solenoid valve comprising:
    first, second, and third ports;
    an armature movable between a first position in which fluid flow from the second port to the third port is blocked and fluid flow from the first port to the third port is unblocked and a second position in which fluid flow from the second port to the third port is unblocked and fluid flow from the first port to the third port is blocked until fluid pressure at the first port exceeds fluid pressure at the third port by a predetermined amount of fluid pressure to thereby provide the check valve functionality, wherein the check valve functionality is integral to the armature; the armature including:
        a first armature portion that moves to allow fluid flow from the first port to the third port when the armature is in the second position and the fluid pressure at the first port exceeds the fluid pressure at the third port by the predetermined amount of fluid pressure;
        a second armature portion that blocks fluid flow from the second port to the third port when the armature is in the first position and allows fluid flow from the second port to the third port when the armature is in the second position; and
        a wall portion having an opening along a path of travel and radially outward of the first armature portion; and
        a first biasing member positioned between the first and second armature portions and for providing a biasing force that corresponds to the predetermined amount of fluid pressure that the fluid pressure at the first port needs to exceed the fluid pressure at the third port before the first armature portion moves to allow fluid flow from the first port to the third port through the opening in the wall portion to provide the check valve functionality; and
    an energizeable solenoid, when energized, moves the armature from the first position to the second position.

2. The solenoid valve according to claim 1, wherein the first biasing member is selected such that the predetermined amount of fluid pressure is less than or equal to ten pounds per square inch.

3. The solenoid valve according to claim 1, wherein the predetermined amount of fluid pressure varies as a function of the biasing force of the first biasing member.

4. The solenoid valve according to claim 1, further comprising:
    a second biasing member partially surrounding the second armature portion and for providing a biasing force to return the armature from the second position back to the first position when the solenoid is de-energized.

5. The solenoid valve according to claim 4, wherein the first biasing member comprises a first coil spring having a longitudinal central axis, and the second biasing member comprises a second coil spring having a longitudinal central axis that is coincident with the longitudinal axis of the second coil spring.

6. The solenoid valve according to claim 1, wherein the first armature portion comprises a select one of a pill, a shuttle, and a flap, which moves to allow fluid flow from the first port to the third port when the armature is in the second position and the fluid pressure at the first port exceeds the fluid pressure at the third port by the predetermined amount of fluid pressure to provide the check valve functionality.

7. The solenoid valve according to claim 1, wherein the solenoid valve has a first supply port that corresponds to the first port, a second supply port that corresponds to the second port, and a delivery port that corresponds to the third port.

8. A solenoid valve with an integrated check valve functionality for an air braking system of a heavy vehicle, the solenoid valve comprising:
    a valve body having a first supply port, a second supply port, and a delivery port;

an armature positioned in the valve body including:
  a first armature portion that allows fluid flow from the first supply port to the delivery port when the armature is in a first position and moves to allow fluid flow from the first supply port to the delivery port when the armature is in a second position and fluid pressure at the first supply port exceeds fluid pressure at the delivery port by a predetermined amount of fluid pressure; and
  a second armature portion that blocks fluid flow from the second supply port to the delivery port when the armature is in the first position and allows fluid flow from the second supply port to the delivery port when the armature is in the second position;
  a wall portion having an opening along a path of travel and radially outward of the first armature portion; and
  a first biasing member positioned between the first and second armature portions and for providing a biasing force that corresponds to the predetermined amount of fluid pressure that the fluid pressure at the first supply port needs to exceed the fluid pressure at the delivery port before the first armature portion moves to allow fluid flow from the first supply port to the delivery port through the opening in the wall portion to provide the check valve functionality for the air braking system of the heavy vehicle, wherein the check valve functionality is integral to the armature; and
an energizeable solenoid, when energized, moves the armature from the first position to the second position.

9. The solenoid valve according to claim 8, wherein the predetermined amount of fluid pressure varies as a function of the biasing force of the first biasing member.

10. The solenoid valve according to claim 8, further comprising:
  a second biasing member partially surrounding the second armature portion and for providing a biasing force to return the armature from the second position back to the first position when the solenoid is de-energized.

11. The solenoid valve according to claim 10, wherein the first biasing member comprises a first coil spring having a longitudinal central axis, and the second biasing member comprises a second coil spring having a longitudinal central axis that is coincident with the longitudinal axis of the second coil spring.

12. The solenoid valve according to claim 8, wherein the first armature portion comprises a select one of a pill, a shuttle, and a flap, which moves to allow fluid flow from the first supply port to the delivery port when the armature is in the second position and the fluid pressure at the first supply port exceeds the fluid pressure at the delivery port by the predetermined amount of fluid pressure to provide the check valve functionality for the air braking system of the heavy vehicle.

13. A solenoid valve comprising:
  a valve body having a first port, a second port, and a third port;
  an armature movable between a first position in which fluid flow from the second port to the third port is blocked and a second position in which fluid flow from the second port to the third port is unblocked, wherein the armature includes:
    a select one of a pill, a shuttle, and a flap, which moves to allow fluid flow from the first port to the third port when the armature is in the second position and fluid pressure at the first port exceeds fluid pressure at the third port by a predetermined amount of fluid pressure to provide functionality of a one-way check valve between the first port and the third port wherein the functionality of a one-way check valve between the first port and the third port is integral to the armature;
    a wall portion having an opening along a path of travel and radially outward of the select one of a pill, a shuttle, and a flap; and
    a biasing member that maintains the select one of a pill, a shuttle, and a flap against a normally-open valve seat associated with the first port until the fluid pressure at the first port exceeds the fluid pressure at the third port by the predetermined amount of fluid pressure wherein the fluid flows between the first port and the third port through the opening in the wall portion; and
  an energizeable solenoid, when energized, moves the armature from the first position to the second position.

* * * * *